United States Patent Office 3,432,534
Patented Mar. 11, 1969

3,432,534
METHOD FOR PREPARING ORGANO-ANTIMONY HALIDES
Nathaniel L. Remes, Livingston, and John J. Ventura, East Brunswick, N.J., assignors to M&T Chemicals Inc., New York, N.Y., a corporation of Delaware
No Drawing. Filed Apr. 24, 1964, Ser. No. 362,456
U.S. Cl. 260—446   16 Claims
Int. Cl. C07f 9/90, 9/92

ABSTRACT OF THE DISCLOSURE

In accordance with certain of its aspects, the process of this invention for preparing a compound of the formula $R_zSbA_{3-z}$ wherein R is selected from the group consisting of alkyl, aryl, and alkenyl; A is a halogen having an atomic weight greater than 19; and $z$ is 1–2, comprises mixing together substantially stoichiometric quantities of $R^xSbA_{3-z}$ and $R^ySbA_{3-y}$ wherein $x$ is 2–3; $y$ is 0–1; and $x$, $y$, and $z$ are different integers thereby forming a reaction mixture; maintaining said reaction mixture at a temperature of 20–100° C. thereby forming $R_zSbA_{3-z}$; and recovering said $R_zSbA_{3-z}$ from said reaction mixture. These organoantimony compounds are useful as stabilizers, pharmacological agents, biocidal agents or used to prepare other organoantimony derivatives.

---

This invention relates to a novel process for the preparation of organoantimony compounds.

Organoantimony compounds of the formula $R_2SbX$ and $RSbX_2$ wherein R is a hydrocarbon group and X is halogen, are useful compounds. For example, they may be used per se as stabilizers, pharmacological agents, biocidal agents, etc., or they may be used to prepare other organoantimony derivatives. It is often desirable to use the organoantimony halide as a pure material, i.e., one which is free of contamination by other organoantimony halides. Heretofore, no practical commercial process has been found which is capable of producing organoantimony halides or the type hereinbefore noted in high yields and high purity.

Prior art attempts to prepare pure organoantimony halide have been generally unsatisfactory. For example, the reaction of triphenylantimony and antimony trichloride, as taught in the prior art, is conducted at high temperatures and involves complicated procedures including procedures for separating e.g. diphenylantimony chloride from phenylantimony dichloride. Such separations have been necessary because the high temperature reactions taught in the prior art produce only mixtures of the two noted organoantimony halides, and are incapable of producing either compound in high yield and substantially pure form.

It is an object of this invention to provide a novel process for preparing organoantimony halides. It is a further object to provide a novel process which is capable of producing substantially quantitative yields of organoantimony compounds of high purity.

In accordance with certain of its aspects, the process of this invention for preparing a compound of the formula $R_zSbA_{3-z}$ wherein R is selected from the group consisting of alkyl, aryl, and alkenyl; A is a halogen having an atomic weight greater than 19; and $z$ is 1–2, comprises mixing together substantially stoichiometric quantities of $R_xSbA_{3-x}$ and $R_ySbA_{3-y}$ wherein $x$ is 2–3; $y$ is 0–1; and $x$, $y$, and $z$ are different integers thereby forming a reaction mixture; maintaining said reaction mixture at a temperature of 20–100° C. thereby forming $R_zSbA_{3-z}$; and recovering said $R_zSbA_{3-z}$ from said reaction mixture.

The organoantimony compounds which may be employed in the practice of this invention may contain a group R which may be a hydrocarbon radical, typically selected from the group consisting of alkyl, aryl, and alkenyl. Typical alkyls may include methyl, ethyl, n-propyl, isopropyl, n-butyl, isobutyl, sec-butyl, tert-butyl, amyl, hexyl, octyl, dodecyl, etc. Typical aryls may include phenyl, naphthyl, phenanthryl, etc. Typical alkenyls may include vinyl, allyl, 1-propenyl, pentenyl, octenyl, etc. R may also bear inert substituents such as alkyl, aryl, ether, nitro, etc., groups. Typical inertly substituted R radicals may include tolyl, ethylphenyl, propylphenyl, benzyl, phenylethyl, phenylpropyl, chlorophenyl, 4-chlorobutyl, nitrophenyl, 2-ethoxyethyl, etc. Preferably, R may be aryl and most preferably R may be phenyl.

The organoantimony compounds of this invention may contain a group A which may be a halogen having a molecular weight greater than 19. Preferably, A may be selected from the group consisting of chlorine, bromine, and iodine and most preferably A may be chlorine.

The first organoantimony reactant which may find use in the process of this invention may have the formula $R_xSbZ_{3-x}$ wherein R and A have the meanings hereinbefore set forth and $x$ is an integer, 2–3. When $x$ is 2, the organoantimony reactant may be a diorganoantimony halide, $R_2SbZ$, including diphenylantimony chloride, dibutylantimony bromide, diallylantimony iodide, ditolylantimony chloride, dibenzylantimony chloride, dichlorophenylantimony bromide, dicyclohexylantimony chloride, dioctylantimony iodide, etc. When $x$ is 3, the organoantimony reactant may be a triorganoantimony compound $R_3Sb$, e.g., triphenylantimony, tributylantimony, tritolylantimony, tribenzylantimony, triallylantimony, trichlorophenylantimony, trioctylantimony, tricyclohexylantimony, etc. Preferably, $x$ may be 3 and R may be aryl and the first organoantimony reactant may be a triarylantimony compound, $R_3Sb$. Most preferably it may be triphenylantimony.

The second antimony reactant may have the formula $R_ySbA_{3-y}$ wherein R and A have the meanings hereinbefore set forth and $y$ is an integer, 0–1. When $y$ is 0, the antimony compound may be an antimony trihalide, $SbA_3$, e.g. antimony trichloride, antimony tribromide, and antimony triiodide. When $y$ is 1, the antimony reactant may be an organoantimony dihalide, $RSbA_2$, e.g., phenylantimony dichloride, tolylantimony dibromide, butylantimony diiodide, benzylantimony dichloride, cyclohexylantimony dibromide, allylantimony diiodide, chlorophenylantimony dichloride, octylantimony dibromide, etc. Preferably $y$ may be 0 and A may be chlorine and the second antimony reactant may be antimony trichloride $SbCl_3$.

The organoantimony halide product produced by the process of this invention may have the formula $R_zSbA_{3-z}$ wherein R and A may have the meanings hereinbefore set forth and $z$ may be an integer, 1 or 2. When $z$ is 1, the organoantimony product may be an organoantimony dihalide, $RSbA_2$, including phenylantimony dichloride, tolylantimony dibromide, butylantimony diiodide, benzylantimony dichloride, cyclohexylantimony dibromide, allylantimony diiodide, chlorophenylantimony dichloride, octylantimony dibromide, etc. When $z$ is 2, the organoantimony product may be a diorganoantimony halide, $R_2SbA$, including diphenylantimony chloride, dibenzylantimony bromide, diallylantimony iodide, ditolylantimony chloride, dibenzylantimony chloride, dichlorophenylantimony bromide, dicyclohexylantimony chloride, dioctylantimony iodide, etc. Preferably R may be aryl, most preferably phenyl, and A may be chlorine, and the organoantimony product may be diphenylantimony chloride or phenylantimony chloride.

In accordance with this invention, $R_xSbA_{3-x}$ may be reacted with $R_ySbA_{3-y}$ to form $R_zSbA_{3-z}$ wherein $x$ is 2–3; $y$ is 0–1; $z$ is 1–2; and $x$, $y$ and $z$ are different integers. The value of $x$ may be greater than or equal to $(y+2)$. Thus, $x$, $y$, and $z$ may have the following values:

| $x$ | $y$ | $z$ |     |
|---|---|---|-----|
| 2 | 0 | 1 | (I) |
| 3 | 0 | 1 | (II) |
| 3 | 0 | 2 | (III) |
| 3 | 1 | 2 | (IV) |

These values may be substituted for $x$, $y$, and $z$, in the general reaction equation $$R_xSbA_{3-x}+R_ySbA_{3-y} \rightarrow R_zSbA_{3-z}$$

the resulting equations balanced as follows:

| | |
|---|---|
| $R_2SbA+SbA_3 \rightarrow 2RSbA_2$ | (I) |
| $R_3Sb+2SbA_3 \rightarrow 3RSbA_2$ | (II) |
| $2R_3Sb+SbA_3 \rightarrow 3R_2SbA$ | (III) |
| $R_3Sb+RSbA_2 \rightarrow 2R_2SbA$ | (IV) |

The reactions associated with Equations II and III may be preferred embodiments of this invention.

The compounds $R_xSbA_{3-x}$ and $R_ySbA_{3-y}$ may preferably be mixed together in substantially stoichiometric quantities to form the desired product $R_zSbA_{3-z}$. The exact stoichiometric quantities are those defined by Equations I, II, III and IV, supra. From these equations, it may be seen that the two reactants may be mixed together in molar ratios of 1:1, 2:1 and 1:2. Substantially stoichiometric quantities may be employed. For example, small excesses, say up to about 10% excess may be tolerated, but most preferably the two reactants may be mixed together in molar quantities which are as close to exact stoichiometry as possible.

Reaction of two reactants may be effected by mixing them together thereby forming a reaction mixture, and maintaining the so-formed reaction mixture at a temperature of 20–100° C. Within this temperature range, high yields of high purity product may be obtained with a minimum of side-reactions, decomposition, etc. Prior art attempts to produce the desired products have been run at high temperatures and have resulted in difficulty separable mixtures rather than pure products. In accordance with this invention, the reaction mixture may be maintained at 20–100° C. Preferably, it may be maintained at this temperature for a period of time sufficient to complete the reaction and typically for about 2–70 hours.

The reaction may be conducted with or without the presence of an inert solvent or diluent. Typically, inert solvents or diluents may include inert liquid hydrocarbons, preferably chlorinated hydrocarbons. The most preferred diluents may be low-boiling chlorinated hydrocarbons having a boiling point between 35 and 85° C., and which are solvents for the reactants. Preferred low-boiling chlorinated hydrocarbon diluents may include methylene chloride, chloroform, carbon tetrachloride, ethylene dichloride, etc.

The organoantimony halide product as produced by the process of this invention may be recovered as pure product or in the form of a solution. When obtained as a solution, the solvent may preferably be stripped off as by vacuum or other low temperature distillation. The product organoantimony halide may be in the form of a viscous oil which may be crystallized by seeding and refrigerating, typically for about 24 hours, after which it may form a solid crystalline mass of high purity product. Typically, the yield of product may be substantially quantitative, i.e., at least 90% of theory and the product may have high purity, i.e., it may have a low degree of contamination by other organoantimony halides. If desired, the product may be recrystallized from a suitable hydrocarbon solvent such as n-hexane or chloroform-hexane mixtures.

Practice of certain specific embodiments of this invention may be observed from the following illustrative examples.

Example 1.—Phenylantimony dichloride $\phi SbCl_2$ $$\phi_3Sb+2SbCl_3 \rightarrow 3\phi SbCl_2$$

88.27 grams (0.25 moles) of triphenylantimony, 114.07 grams (0.5 moles) of antimony trichloride and 500 ml. of methylene chloride were charged to a one liter flask. The mixture was heated to reflux and reflux for 64 hours. The resultant solution was filtered hot to remove a trace of insoluble material and the filtrate was placed in a rotary film evaporator to strip off solvent. The residue after stripping was an oil which was crystallized by seeding and cooling. Product phenylantimony dichloride, melting point 53–57° C., was recovered in 95% yield.

*Analysis.*—Theory: Sb, 45.13; Cl, 26.29. Found: Sb, 44.95; Cl, 26.41.

Example 2.—Diphenylantimony chloride $\phi_2SbCl$ $$2\phi_3Sb+SbCl_3 \rightarrow 3\phi_2SbCl$$

176.53 grams (0.5 mole) of triphenylantimony, 57.03 grams (0.25 mole) of antimony trichloride and 500 ml. of methylene chloride were charged to a one liter flask. The mixture was heated to reflux and refluxed for 64 hours. The resultant hot solution was clarified by filtration and the filtrate was placed in a rotary film evaporator to strip off solvent. The residue after stripping was an oil which was crystallized by seeding and cooling. Product diphenylantimony chloride, melting point 61–65° C., was recovered in 91.6% yield. When this product was mixed with the product of Example 1, the melting point was depressed to 32–34° C., thus showing that substantially pure product was obtained from both preparations.

Example 3.—Diphenylantimony chloride $\phi_2SbCl$ $$\phi_3Sb+\phi SbCl_2 \rightarrow 2\phi_2SbCl$$

A solution of 35.3 grams (0.1 mole) of triphenylantimony and 27 grams (0.1 mole) of phenylantimony dichloride in 250 ml. of methylene chloride was heated to reflux and refluxed for 48 hours. The resultant solution was filtered hot and placed in a rotary film evaporator to strip off solvent. The residue after stripping was an oil which was crystallized by seeding and cooling. Product diphenylantimony chloride, melting point 59–69° C., was obtained in 93% yield. Its structure was corroborated by taking a mixed melting point with the product of Example 2 and finding no depression of melting point.

Example 4.—Phenylantimony dichloride $\phi SbCl_2$ $$\phi_2SbCl+SbCl_3 \rightarrow 2\phi SbCl_2$$

A solution of 62.3 grams (0.2 mole) of diphenylantimony chloride and 45.6 grams (0.2 moles) of antimony trichloride in 500 ml. of methylene chloride may be refluxed with stirring for 48 hours. The resulting solution may be filtered hot and the filtrate placed in a rotary film evaporator to strip off solvent. Product phenylantimony dichloride may be recovered as an oil which crystallizes upon cooling and seeding to give a yield of at least 90% of theory.

As may be seen from the foregoing illustrative examples, the process of this invention unexpectedly permits preparation of substantially quantitative yields of high purity organoantimony halides.

Although this invention has been illustrated by reference to specific examples, numerous changes and modifications thereof will be apparent to those skilled in the art.

We claim:

1. The process for preparing a compound of the formula $R_zSbA_{3-z}$ wherein R is selected from the group consisting of alkyl, aryl, and alkenyl; A is a halogen having an atomic weight greater than 19; and $z$ is 1–2, which comprises mixing together substantially stoichiometric quantities of $R_xSbA_{3-x}$ and $R_ySbA_{3-y}$ wherein $x$ is 2–3; $y$ is 0–1; and $x$ and $y$ and $z$ are different integers, thereby forming a reaction mixture; maintaining said reaction mixture at a temperature of 20–100° C. thereby forming $R_zSbA_{3-z}$; and recovering said $R_zSbA_{3-z}$ from said reaction mixture.

2. The process according to claim 1 wherein R is aryl.

3. The process according to claim 1 wherein R is phenyl.

4. The process according to claim 1 wherein A is chlorine.

5. The process according to claim 1 wherein $R_xSbA_{3-x}$ and $R_ySbA_{3-y}$ are mixed together in the presence of an inert liquid hydrocarbon solvent.

6. The process for preparing a compound of the formula $R_zSbA_{3-z}$ wherein R is selected from the group consisting of alkyl, aryl, and alkenyl; A is a halogen having an atomic weight greater than 19; and z is 1–2, which comprises mixing together substantially stoichiometric quantities of $R_3Sb$ and $SbA_3$ thereby forming a reaction mixture; maintaining said reaction mixture at a temperature of 20–100° C. thereby forming $R_zSbA_{3-z}$; and recovering said $R_zSbA_{3-z}$ from said reaction mixture.

7. The process according to claim 6 wherein R is aryl.

8. The process according to claim 6 wherein R is phenyl.

9. The process according to claim 6 wherein A is chlorine.

10. The process according to claim 6 wherein $R_3Sb$ and $SbA_3$ are mixed together in the presence of an inert liquid hydrocarbon solvent.

11. The process for preparing diphenylantimony chloride which comprises mixing together 2 moles of triphenylantimony to 1 mole of antimony trichloride thereby forming a reaction mixture; maintaining said reaction mixture at a temperature of 20–100° C. thereby forming diphenylantimony chloride; and recovering said diphenylantimony chloride from said reaction mixture.

12. The process according to claim 11 wherein triphenylantimony and antimony trichloride are mixed together in the presence of an inert liquid hydrocarbon solvent.

13. The process according to claim 12 wherein said reaction mixture is maintained at 35–60° C.

14. The process for preparing phenylantimony dichloride which comprises mixing together 1 mole of triphenylantimony to 2 moles of antimony trichloride thereby forming a reaction mixture; maintaining said reaction mixture at a temperature of 20–100° C. thereby forming phenylantimony dichloride; and recovering said phenylantimony dichloride from said reaction mixture.

15. The process according to claim 14 wherein triphenylantimony and antimony trichloride are mixed together in the presence of an inert liquid hydrocarbon solvent.

16. The process according to claim 15 wherein said reaction mixture is maintained at 35–60° C.

References Cited

Challenger et al.: Journal of the Chemical Society (London) (1924), vol. 125, pp. 864 to 868.

Maier et al.: J.A.C.S. (1957), vol. 79, pp. 5884 to 5888.

HELEN M. McCARTHY, *Primary Examiner.*

W. F. W. BELLAMY, *Assistant Examiner.*

U.S. Cl. X.R.

260—45.75, 999